United States Patent [19]

Nakao et al.

[11] 4,454,560

[45] Jun. 12, 1984

[54] IGNITION DETECTOR CIRCUIT

[75] Inventors: Satoshi Nakao, Tokyo; Yasuo Taguchi, Yokohama, both of Japan

[73] Assignee: Tokyo Shibaura Denki Kabushiki Kaisha, Kawasaki, Japan

[21] Appl. No.: 319,410

[22] Filed: Nov. 9, 1981

[30] Foreign Application Priority Data

Nov. 18, 1980 [JP] Japan ................................ 55-162353

[51] Int. Cl.[3] .......................... F23Q 3/00; B62D 45/00

[52] U.S. Cl. .................................... 361/257; 307/10 R

[58] Field of Search ........................ 361/257; 307/10 R

[56] References Cited

U.S. PATENT DOCUMENTS 2,998,470 8/1961 McClure ........................ 307/10 R X 4,261,025 4/1981 Chafer et al. ........................ 361/257

4,286,683 9/1981 Zeigner et al. ................ 307/10 R X

*Primary Examiner*—Donald A. Griffin

*Attorney, Agent, or Firm*—Finnegan, Henderson, Farabow, Garrett & Dunner

[57] ABSTRACT

An ignition detector circuit includes first and second resistors connected in series between a primary winding of a coil and the ground, a comparator having a first input terminal connected to the junction between first and second resistors and a second input terminal to which a reference voltage is applied, and a capacitor and a third resistor connected in parallel between the first input terminal of the comparator and the ground.

12 Claims, 9 Drawing Figures

FIG. 1
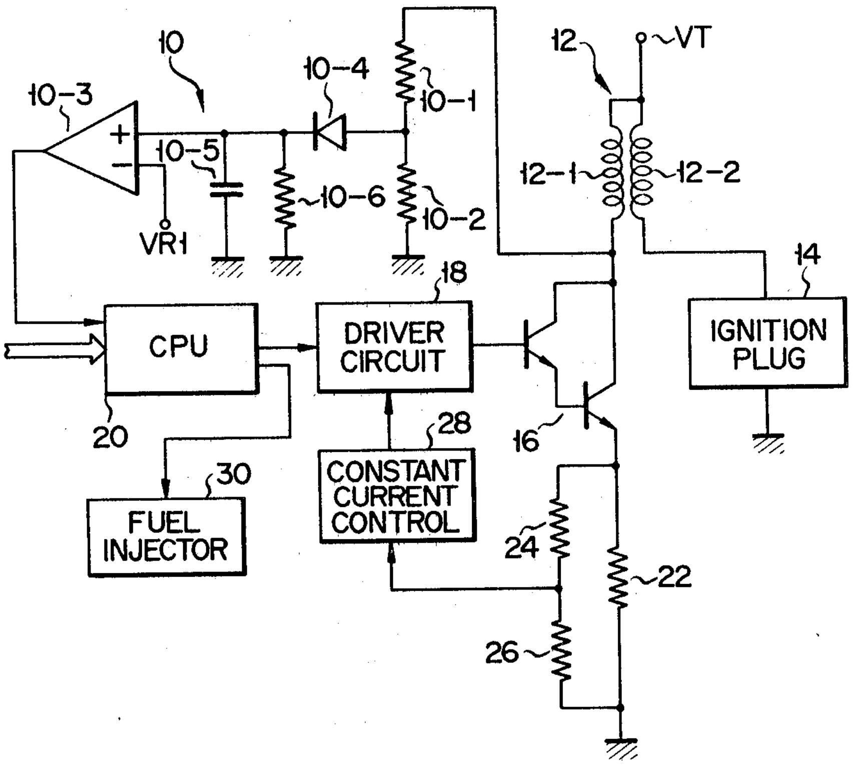
FIG. 2A
FIG. 2B
FIG. 2C
FIG. 2D
FIG. 2E
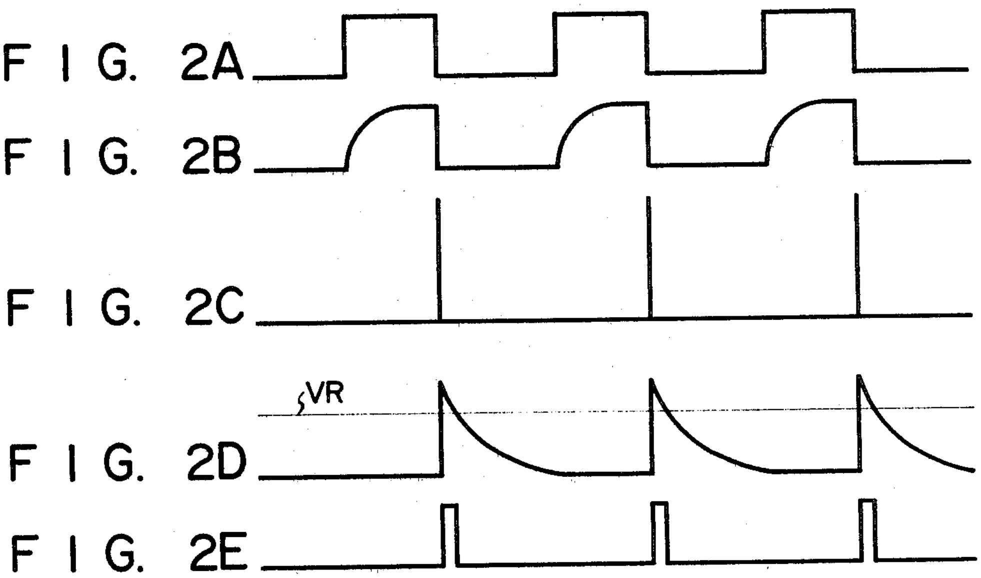

IGNITION DETECTOR CIRCUIT

BACKGROUND OF THE INVENTION

The present invention relates to an ignition detector circuit for detecting the operating condition of an engine ignition device.

When the ignition plug of engine ignition device was prevented by some cause from carrying out ignition operation, fuel gas conventionally continued to be supplied to the engine even though combustion was not carried out in the engine. As the result, some problems such as incomplete combustion were caused.

SUMMARY OF THE INVENTION

An object of the present invention is to provide an ignition detector circuit for detecting that the ignition plug is being normally operated to reliably ignite fuel gas.

According to the present invention there is provided an ignition detector circuit comprising voltage detecting means for detecting a voltage at the primary winding of an ignition coil, capacitive means charged in accordance with an output voltage applied from the voltage detecting means, discharging means for causing the capacitive means to be discharged, and voltage comparing means for comparing a voltage charged on the capacitive means with a reference voltage and generating an output signal according to the result of voltage comparison.

According to the present invention, a voltage at the primary winding of an ignition coil is detected and an output signal representing that the ignition operation has been appropriately carried out is generated when this voltage becomes larger than a predetermined value at the time of ignition operation. The present invention therefore enables ignition operation to be easily checked depending upon the presence of output signal and also the control of fuel supply to be easily and reliably carried out.

BRIEF DESCRIPTION OF THE DRAWINGS

FIG. 1 is a circuit diagram showing an ignition device in which an example of an ignition detector circuit which is an embodiment of the present invention is employed;

FIGS. 2A through 2E are views showing signal waveforms to explain the operation of the ignition device shown in FIG. 1;

DETAILED DESCRIPTION OF THE PREFERRED EMBODIMENTS

Figure 3:
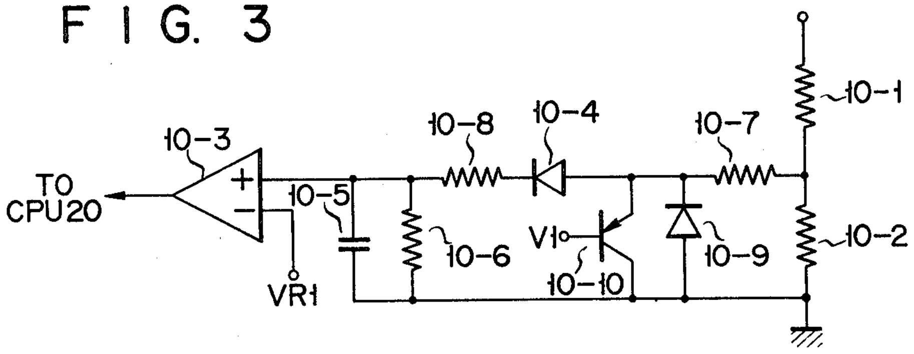
FIGS. 3 and 4 are circuit diagrams showing other examples of ignition detector which are embodiments of the present invention.

FIG. 1 is a circuit diagram showing an ignition device provided with an ignition detector circuit 10 which is an embodiment of the present invention. The ignition device includes an ignition coil 12 having primary and secondary windings 12-1 and 12-2 whose one ends are connected to a power source terminal VT, an ignition plug 14 connected between the other end of the secondary winding 12-2 and the ground, a transistor switching circuit 16 having a current path connected in series with the primary winding 12-1, and a driver circuit 18 for driving the switching circuit 16 in response to a duty control signal applied from a central processing unit (CPU) 20 which will be described later. The ignition device further includes a resistor 22 connected between the other end of the current path of the switching circuit 16 and the ground, a series circuit of resistors 24 and 26 connected in parallel with the resistor 22, and a constant current control circuit 28 for keeping at a constant value a current flowing through the primary winding 12-1 by supplying an OFF signal to the driver circuit 18 to turn OFF the switching circuit 16 when a voltage appearing at the junction between the resistors 24 and 26 exceeds a predetermined value. Control and driver circuits 28 and 18 are disclosed in U.S. patent application Ser. No. 283,347 (based on Japanese patent application Nos. 55-96750 and 55-96757) invented by the same inventors and assigned to the same assignee, and filed on July 14, 1981.

CPU 20 receives parameter signals such as those representing the rotation speed of a wheel, the temperature of cooling water and the position at which the gear is set, and supplies to the driver circuit 18 a duty control signal having such a duty ratio as to allow current to flow through the primary winding 12-1 of ignition coil 12 for an appropriate time period. Ignition timing of the ignition plug 14 is thus controlled. When it is detected that an output pulse is generated through the ignition detector circuit 10, CPU 20 also supplies a fuel control signal to a fuel injector 30 of electronic type causing the fuel injector 30 to supply fuel to combustion chamber (not shown) of the engine from a fuel source (not shown).

The ignition detector circuit 10 includes resistors 10-1 and 10-2 connected in series between the other end of the primary winding 12-1 and the ground, a comparator circuit 10-3 whose first input terminal is connected via a diode 10-4 to the junction between the resistors 10-1 and 10-2, and a capacitor 10-5 and a resistor 10-6 each connected between the first input terminal of the comparator circuit 10-3 and the ground. To a second input terminal of the comparator circuit 10-3 is applied a reference voltage VR1 and when an input voltage applied to the first input terminal of the comparator circuit 10-3 becomes larger than the input voltage VR1 applied to the second input terminal thereof, the comparator circuit 10-3 supplies a high level signal to CPU 20.

The operation of ignition device shown in FIG. 1 will be now described referring to FIGS. 2A through 2E.

CPU 20 supplies to the driver circuit 18 a duty control signal shown in FIG. 2A and having such a duty cycle as to correspond to input parameters. In the case of this example, the driver circuit 18 makes the switching circuit 16 conductive responsive to a duty control signal of high level supplied from CPU 20. A coil current gradually rising as shown in FIG. 2B is thus caused to flow through the primary winding 12-1 and resistor 22. When a coil current reaches a predetermined value, that is, when potential at the junction between the resistors 24 and 26 reaches the predetermined value, the constant current control circuit 28 applies an inhibit signal to the driver circuit 18. The driver circuit 18 turns OFF the switching circuit 16 responsive to the inhibit signal. The inhibit signal from the constant current control circuit 28 is thus interrupted to render the switching circuit 16 conductive again, whereby a coil current is held at a constant value. When a duty control signal from CPU 20 becomes of low level thereafter, a coil current is rapidly interrupted as shown in FIG. 2B. An extremely high induction voltage is generated at the secondary winding 12-2 at this time to trigger the ignition plug 14. In addition, when a coil current is interrupted, a high voltage pulse having a pulse width of 20μ seconds and a peak voltage of about 350 V, for example, is generated, as shown in FIG. 2C, at the other end of the primary winding 12-1. This high voltage is divided by the resistors 10-1 and 10-2 to generate a voltage ranging from several volts to 10-odd volts at the junction between the resistors 10-1 and 10-2. This voltage appearing at the junction between the resistors 10-1 and 10-2 charges the capacitor 10-5 through the diode 10-4. Charged voltage of capacitor 10-5 therefore rises to several volts to 10-odd volts instantly as shown in FIG. 2D and is then discharged to zero volts through the resistor 10-6 at a ratio which corresponds to a time constant determined by the capacitor 10-5 and resistor 10-6. Charged voltage of the capacitor 10-5 is also applied to the first input terminal of the comparator 10-3 and when this charged voltage is higher than the reference voltage VR1, the comparator 10-3 generates a pulse signal of high level as shown in FIG. 2E. When a constant coil current flowing to the primary winding 12-1 is rapidly interrupted as described above, an ignition voltage is generated at the secondary winding while a pulse is generated through the comparator 10-3. An output pulse applied from the comparator 10-3 is supplied to CPU 20, which judges when receiving an output pulse that the ignition plug 14 is carrying out the proper ignition operation and supplies a fuel control signal to the electronic fuel injector 30 causing the fuel injector 30 to inject fuel supplied from the fuel source to the combustion chamber of engine.

On the other hand, in a case where some cause prevents coil current from reaching the predetermined value and a constant coil current from being rapidly interrupted thus preventing the extremely high ignition voltage at the secondary winding, the ignition plug 14 is not triggered. A high voltage is not generated at the other end of the primary winding 12-1 in this case and a voltage high enough to cause the comparator 10-3 to generate an output pulse is not charged on the capacitor 10-5. Therefore, CPU 20 judges that no ignition operation is carried out by the ignition plug 14 and inhibits the operation of the electronic combustion injector 30 to prevent fuel of fuel source from being supplied to the combustion chamber of engine. Fuel gas not ignited is ignited in a next ignition cycle, thus preventing incomplete combustion from being performed.

FIG. 3 is a circuit diagram showing another example of ignition detector circuit according to the present invention. This example is the same as the ignition detector circuit 10 shown in FIG. 1 except that the anode of diode 10-4 is connected via a resistor 10-7 to the junction between the resistors 10-1 and 10-2 while the cathode thereof is connected via a resistor 10-8 to the first input terminal of comparator 10-3 and that current paths of a diode 10-9 and a transistor 10-10 are connected with each other between the anode of diode 10-4 and the ground. Resistors 10-7, 10-8 and the diode 10-9 are intended to protect the diode 10-4 and transistor 10-10.

In the case of ignition detector circuit shown in FIG. 3, a constant voltage V1 (>VR) is applied to the transistor 10-10 and when an anode voltage of diode 10-4 becomes larger than a predetermined value (V1+V2) in which V2 represents a voltage between the emitter and base of the transistor 10-10, the transistor 10-10 is rendered conductive to keep an anode voltage of diode 10-4 at the predetermined value (V1+V2). Namely, the transistor 10-10 serves as a constant voltage circuit. Therefore, when the ignition operation is carried out, the capacitor 10-5 is charged to the predetermined voltage (V1+V2). The charged voltage of capacitor 10-5 takes the predetermined value even if potential at the junction between the resistors 10-1 and 10-2 changes in a range above the predetermined value, and the discharging characteristic of capacitor 10-5 shown in FIG. 2D therefore becomes about the same in each of cycles and the comparator 10-3 always generates a pulse having a substantially constant pulse width.

Figure 4:
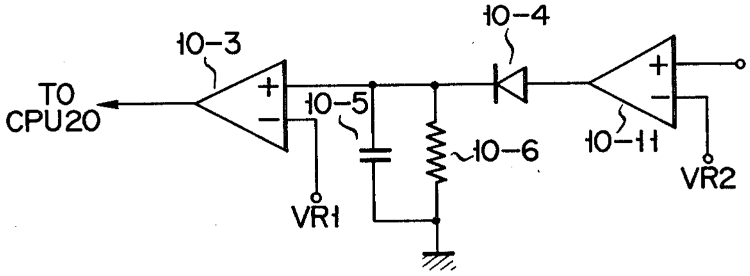

FIG. 4 is a circuit diagram showing a further example of ignition detector circuit according to the present invention. This example is the same as the ignition detector circuit shown in FIG. 1 except that a comparator 10-11 is used instead of resistors 10-1 and 10-2, this comparator having a first input terminal connected to the junction between the primary winding 12-1 and the switching circuit 16 (FIG. 1), a second input terminal to which a reference voltage VR2 is applied, and an output terminal connected to the anode of diode 10-4.

When the ignition operation is carried out and a voltage higher than the reference voltage VR2 is applied to the first input terminal of the comparator 10-11 in this example, a voltage having a predetermined amplitude is generated through the comparator 10-11 and the capacitor 10-5 is charged to a predetermined voltage. Therefore, this example of ignition detector circuit can achieve the same effect as attained by the ignition detector circuit shown in FIG. 3.

Figure 5:
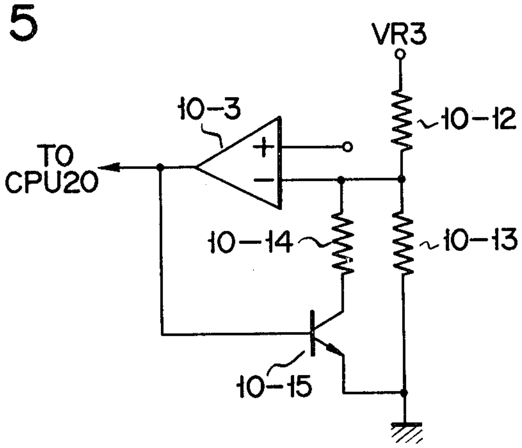
FIG. 5 is a circuit diagram showing a comparator having hysteresis characteristic usable in ignition detector circuits shown in FIGS. 1, 3 and 4.

Although the present invention has been described with reference to some embodiments thereof, it should be understood that the present invention is not limited to these embodiments. Although voltage charged on the capacitor 10-5 is discharged through the resistor 10-6, for example, in these embodiments of the present invention, it is possible to use a constant current circuit instead of resistor 10-6. An output pulse is supplied from the comparator 10-3 to CPU 20 to control the electronic fuel injector 30 in these embodiments, but it is also possible that an output pulse of this comparator 10-3 is supplied, as a control signal, directly to the electronic fuel injector 30 to control the operation of this fuel injector 30. It is also possible to add to the comparator 10-3 employed in these embodiments a circuit comprising resistors 10-12 and 10-13 connected in series between a reference power source terminal VR3 and the ground, a resistor 10-14 whose one end is connected to the second input terminal of comparator 10-3 and the junction between resistors 10-12 and 10-13, and an npn-transistor 10-15 whose current path is connected between the other end of the resistor 10-14 and the ground and whose base is connected to the output terminal of the comparator 10-3, as shown in FIG. 5. When a signal of low level is generated through the comparator 10-3 in the circuit shown in FIG. 5, the transistor 10-15 is turned OFF and a high reference voltage VH is applied to the second input terminal of the comparator 10-3 while a high voltage is applied to the first input terminal thereof. When a signal of high level is thus generated through the comparator 10-3, the transistor 10-15 is made conductive and a low reference voltage VL is applied to the second input terminal of the comparator 10-3. Namely, the circuit shown in FIG. 5 serves as a comparator circuit having hysteresis characteristic.

Accordingly, when a voltage even slightly higher than the high reference voltage is applied to the first input terminal of the comparator 10-3, a pulse having a pulse width wider than a certain value is generated through the comparator 10-3.

What we claim is:

1. An ignition detector circuit comprising:
   - voltage detecting means for detecting a voltage at a primary winding of an ignition coil and generating an output voltage according to the voltage detected;
   - capacitive means charged according to the output voltage from said voltage detecting means, said capacitive means storing a voltage which becomes higher than a predetermined voltage only when a voltage impulse is generated at the primary winding immediately after a constant coil current through the primary winding is rapidly interrupted;
   - discharging means for causing said capacitive means to be discharged; and
   - a comparator circuit for comparing the voltage charged on said capacitive means with said predetermined voltage to generate an output signal according to the result of the comparison.

2. An ignition detector circuit according to claim 1 wherein said comparator circuit generates an output signal of first level when the voltage charged on said capacitive means is larger than said reference voltage and an output signal of second level when said charged voltage is smaller than said reference voltage.

3. An ignition detector circuit according to claim 1 or 2 wherein said voltage detecting means comprises first and second resistors connected in series between said primary winding and a reference power source terminal and generates an output signal through the junction between said first and second resistors.

4. An ignition detector circuit according to claim 3 wherein said discharging means comprises a resistor connected in parallel with said capacitive means.

5. An ignition detector circuit according to claim 4 wherein said voltage detecting means further includes a third resistor whose one end is connected to the junction between said first and second resistors, and a constant voltage circuit connected to the other end of said third resistor and the reference power source terminal to keep the output voltage of said voltage detecting means at a predetermined voltage when a voltage appearing at the junction between said first and second resistors becomes larger than a predetermined value.

6. An ignition detector circuit according to claim 5 wherein said constant voltage circuit comprises a transistor to the base of which is applied a predetermined voltage.

7. An ignition detector circuit according to claim 3 wherein said voltage detecting means comprises a comparator having a first input terminal connected to the primary winding of said ignition coil and a second input terminal to which said reference voltage is applied.

8. An ignition detector circuit according to claim 7 wherein said discharging means comprises a resistor connected in parallel with said capacitive means.

9. An ignition detector circuit according to claim 8 wherein said comparator circuit has hysteresis characteristic.

10. An ignition detector circuit according to claim 7 wherein said comparator circuit has hysteresis characteristic.

11. An ignition detector circuit according to claim 3 wherein said voltage detecting means further includes a third resistor whose one end is connected to the junction between said first and second resistors, and a constant voltage circuit connected to the other end of said third resistor and the reference power source terminal to keep the output voltage of said voltage detecting means at a predetermined voltage when a voltage appearing at the junction between said first and second resistors becomes larger than a predetermined value.

12. An ignition detector circuit according to claim 11 wherein said constant voltage circuit comprises a transistor to the base of which is applied a predetermined voltage.

* * * * *